United States Patent
Wada et al.

(10) Patent No.: US 10,715,263 B2
(45) Date of Patent: Jul. 14, 2020

(54) INFORMATION PROCESSING APPARATUS, METHOD AND NON-TRANSITORY COMPUTER-READABLE STORAGE MEDIUM

(71) Applicant: FUJITSU LIMITED, Kawasaki-shi, Kanagawa (JP)

(72) Inventors: Akihiro Wada, Kawasaki (JP); Teruhisa Ninomiya, Yokohama (JP); Makoto Hamaminato, Kawasaki (JP); Hiromasa Yamauchi, Kawasaki (JP); Kaoru Yokoo, Yokosuka (JP); Kensuke Sawada, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/103,353

(22) Filed: Aug. 14, 2018

(65) Prior Publication Data
US 2019/0068302 A1    Feb. 28, 2019

(30) Foreign Application Priority Data
Aug. 25, 2017    (JP) .................... 2017-161854

(51) Int. Cl.
*H04B 17/318*    (2015.01)
*H04B 17/391*    (2015.01)
(Continued)

(52) U.S. Cl.
CPC .......... *H04B 17/318* (2015.01); *G01S 1/0423* (2019.08); *H04B 17/21* (2015.01);
(Continued)

(58) Field of Classification Search
CPC .................................................. H04B 17/318
See application file for complete search history.

(56) References Cited

U.S. PATENT DOCUMENTS

| | | | |
|---|---|---|---|
| 2009/0191894 A1* | 7/2009 | Poegel | G01S 5/0215 455/456.1 |
| 2011/0183690 A1* | 7/2011 | Kobayakawa | G01S 5/0215 455/456.5 |

(Continued)

FOREIGN PATENT DOCUMENTS

| | | |
|---|---|---|
| JP | 2008-270875 | 11/2008 |
| JP | 2012-173070 | 9/2012 |

OTHER PUBLICATIONS

"Procedurally generated environments for simulating RSSI-localization applications" Sam Shue, James Conrad Virginia Beach, VA Apr. 23-26, 2017 (Year: 2017).*

(Continued)

*Primary Examiner* — Kevin M Cunningham
(74) *Attorney, Agent, or Firm* — Fujitsu Patent Center

(57) ABSTRACT

An information processing apparatus includes a memory, and a processor coupled to the memory and configured to obtain location information indicating locations of a wireless transmitter and a wireless receiver, simulate a first power of a first reception signal at the wireless receiver in a condition that a radio signal is transmitted from the wireless transmitter, identify a first probability distribution model in accordance with the first reception signal, identify a first parameter of the first probability distribution model in accordance with the first power and a propagation environment defined by the locations of the wireless transmitter and the wireless receiver indicated by the location information, and based on the first probability distribution model using the first parameter, simulate a second power of a second reception signal at around the wireless receiver.

20 Claims, 15 Drawing Sheets

(51) Int. Cl.
  *H04B 17/27* (2015.01)
  *H04W 64/00* (2009.01)
  *H04B 17/21* (2015.01)
  *H04W 4/02* (2018.01)
  *H04B 17/29* (2015.01)
  *H04B 17/26* (2015.01)
  *G01S 1/04* (2006.01)
  *G01S 5/02* (2010.01)

(52) U.S. Cl.
  CPC ............ *H04B 17/26* (2015.01); *H04B 17/27* (2015.01); *H04B 17/29* (2015.01); *H04B 17/3912* (2015.01); *H04W 4/025* (2013.01); *H04W 64/003* (2013.01); *G01S 5/0252* (2013.01); *H04W 64/00* (2013.01)

(56) References Cited

U.S. PATENT DOCUMENTS

| | | | | |
|---|---|---|---|---|
| 2013/0260771 A1* | 10/2013 | Wirola | ................. | G01S 5/0252 455/446 |
| 2015/0177279 A1* | 6/2015 | Ohtsuka | ............ | G01R 31/1272 702/66 |
| 2017/0215221 A1* | 7/2017 | Segev | ................... | H04W 72/00 |
| 2018/0348334 A1* | 12/2018 | Millman | ............... | G01S 5/0252 |
| 2018/0352379 A1* | 12/2018 | Kong | .................... | H04W 4/029 |

OTHER PUBLICATIONS

"Rayleigh Distribution", MathWorks, Online <https://jp.mathworks.com/help/stats/rayleigh-distribution.html?lang=en>, May 14, 2018, with English Version (6 pages).

"Rician Distribution", MathWorks, Online <https://jp.mathworks.com/help/stats/rician-distribution.html?lang=en>, May 14, 2018, with English Version (3 pages).

Pavel Davidson et al., "A Survey of Selected Indoor Positioning Methods for Smartphones", IEEE Communications Surveys & Tutorials, vol. 19, No. 2, Second Quarter 2017, pp. 1347-1370, 2017 (24 pages).

Hiromasa Yamauchi et al., "Estimation of Received Level Variations by movement of objects in the room using Ray Tracing Method", IEICE Technical Report, The Institute of Electronics, Information and Communication Engineers, 2016 (6 pages).

* cited by examiner (a)　　　　　　　　　　　　(b)

INFORMATION PROCESSING APPARATUS, METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-161854, filed on Aug. 25, 2017, the entire contents of which are incorporated herein by reference.

FIELD

The embodiment discussed herein is related to an information processing apparatus, a method and a non-transitory computer-readable storage medium.

BACKGROUND

A positioning system that estimates the position of a receiver by utilizing a received electric field strength in accordance with a received signal received by the receiver from a transmitter has been disclosed. As related arts, for example, there are Japanese Laid-open Patent Publication No. 2012-173070, and Japanese Laid-open Patent Publication No. 2008-270875.

SUMMARY

According to an aspect of the invention, an information processing apparatus includes a memory, and a processor coupled to the memory and configured to obtain location information indicating locations of a wireless transmitter and a wireless receiver, simulate a first power of a first reception signal at the wireless receiver in a condition that a radio signal is transmitted from the wireless transmitter, identify a first probability distribution model in accordance with the first reception signal, identify a first parameter of the first probability distribution model in accordance with the first power and a propagation environment defined by the locations of the wireless transmitter and the wireless receiver indicated by the location information, and based on the first probability distribution model using the first parameter, simulate a second power of a second reception signal at around the wireless receiver.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

The positioning accuracy of a positioning system is significantly influenced by the environment (layout or motion of a moving object) into which the positioning system is introduced or by transceiver performance. It is therefore difficult to know the positioning accuracy in an environment before introduction. When desired positioning accuracy is not obtained, problems such as reinstallation of a transmitter on site may occur.

It appears to be possible to estimate positioning accuracy by using a radio wave propagation simulation to calculate received power at different locations. In a radio wave propagation simulation, however, a simulation is repeated for all position candidates, which increases the time taken to calculate received power.

Figure 1:
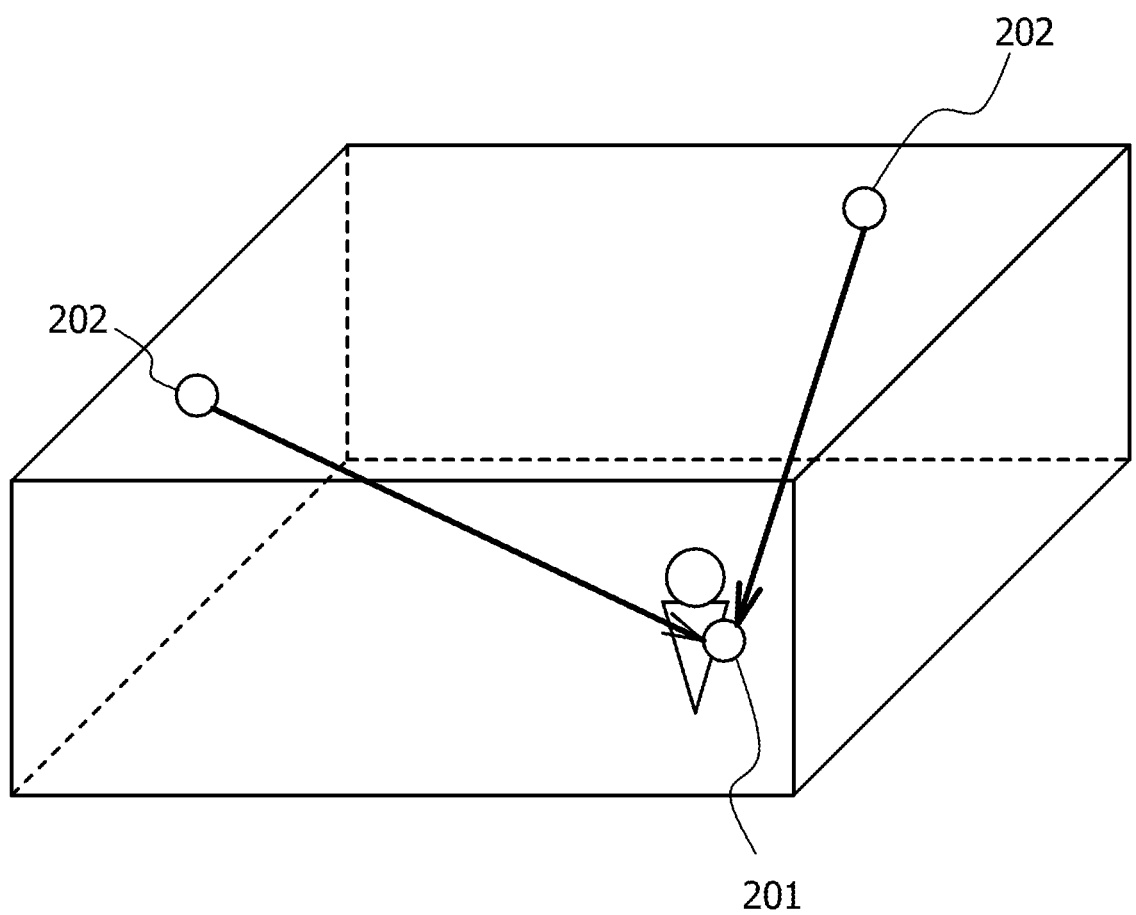
FIG. 1 is a diagram illustrating a positioning system.

Prior to describing embodiments, a summary of a positioning system to be simulated will be described. FIG. 1 is a schematic diagram illustrating a positioning system. As illustrated in FIG. 1, a positioning system has a structure containing a receiver 201 and one or more transmitters (positioning anchors) 202. The receiver 201 is attached to a moving object such as a person or physical thing. Each of the transmitters 202 is installed at a fixed position in the structure.

Each of the transmitters 202 transmits a radio signal at a predetermined time interval. The receiver 201 receives a radio signal from each of the transmitters 202. The positioning system estimates the position of the receiver 201 from each of the transmitters 202 by using an incoming radio wave parameter of packets received by the receiver 201 and estimates the location of each of the transmitters 202. As an incoming radio wave parameter, received power (Received Signal Strength Indication (RSSI)) may be used, for example.

The positioning accuracy of a positioning system is significantly influenced by the environment (layout or motion of a moving object) into which the positioning system is introduced or by transceiver performance. It is therefore difficult to know the positioning accuracy in an environment before introduction. When desired positioning accuracy is not obtained, problems such as reinstallation of a transmitter on site may occur.

Thus, it appears to be possible to estimate positioning accuracy by using a radio wave propagation simulation to calculate an RSSI value at each location. The use of a radio wave propagation simulation provides merits such as being able to check the performance without installation of a transceiver, being able to easily correct the location of the transceiver, or the like. On the other hand, in a radio wave propagation simulation, a simulation is repeated for all position candidates, which increases calculation costs. Further, in order to improve the measurement accuracy in the positioning accuracy, it is preferable to increase the number of position candidates. In this case, the time taken to calculate received power increases.

Thus, in the embodiments below, a received power estimation device, a received power estimation method, and a received power estimation program that can reduce the time taken to calculate received power will be described.

First Embodiment

Figure 2A:
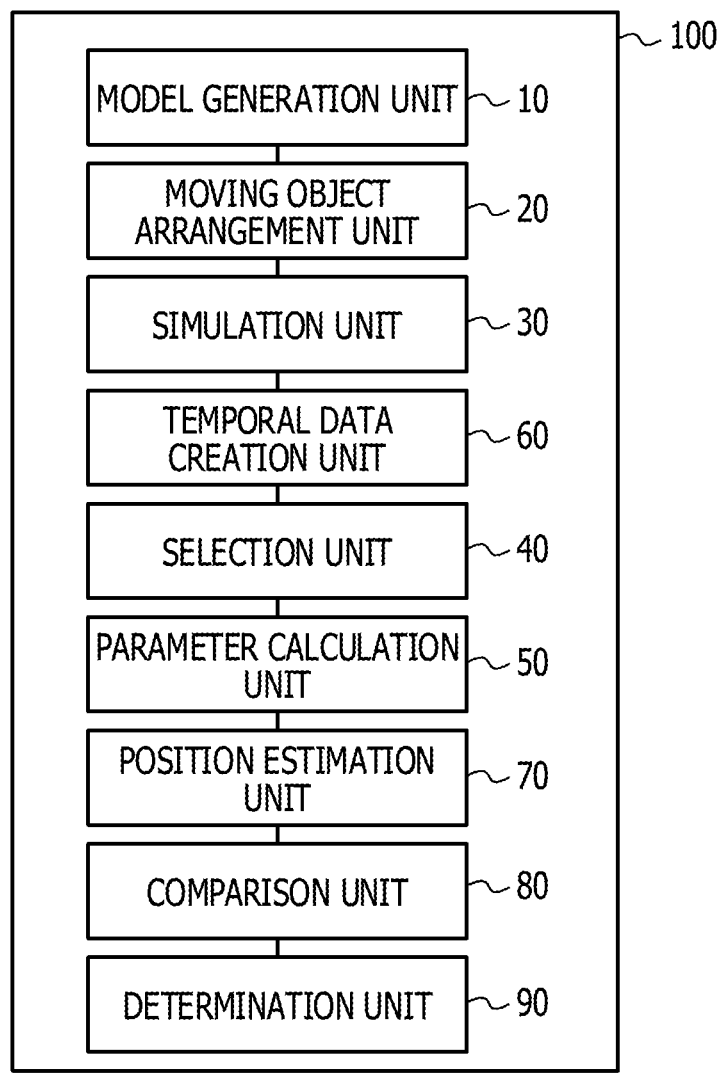
FIG. 2A is a block diagram illustrating the overall configuration of a received power estimation device according to the first embodiment.

FIG. 2A is a block diagram illustrating the overall configuration of the received power estimation device 100 according to the first embodiment. As illustrated in FIG. 2A, the received power estimation device 100 has a model generation unit 10, a moving object arrangement unit 20, a simulation unit 30, a selection unit 40, a parameter calculation unit 50, a temporal data creation unit 60, a position estimation unit 70, a comparison unit 80, a determination unit 90, and the like.

Figure 2B:
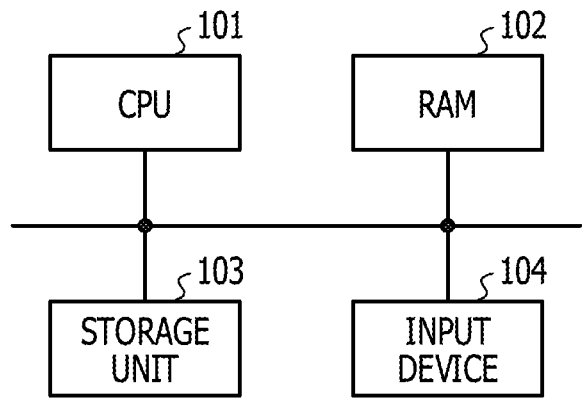
FIG. 2B is a block diagram illustrating a hardware configuration of the received power estimation device.

FIG. 2B is a block diagram illustrating a hardware configuration of the received power estimation device 100. As illustrated in FIG. 2B, the received power estimation device 100 has a CPU 101, a RAM 102, a storage device 103, an input device 104, and the like. These devices are coupled to each other by a bus or the like. The central processing unit (CPU) 101 is a central processing device. The CPU 101 includes one or more cores. The random access memory (RAM) 102 is a volatile memory device that temporarily stores a program executed by the CPU 101 or data processed by the CPU 101. The storage device 103 is a nonvolatile storage device. As the storage device 103, for example, a read-only memory (ROM), a solid state drive (SSD) such as a flash memory, a hard disk drive, or the like may be used. When the CPU 101 executes a received power estimation program stored in the storage device 103, the program is implemented by using the model generation unit 10, the moving object arrangement unit 20, the simulation unit 30, the selection unit 40, the parameter calculation unit 50, the temporal data creation unit 60, the position estimation unit 70, the comparison unit 80, the determination unit 90, and the like. Note that the model generation unit 10, the moving object arrangement unit 20, the simulation unit 30, the selection unit 40, the parameter calculation unit 50, the temporal data creation unit 60, the position estimation unit 70, the comparison unit 80, and the determination unit 90 may each be formed of a dedicated circuit or the like. The input device 104 is a device with which a user inputs information and may be a keyboard, a mouse, or the like.

Figure 3:
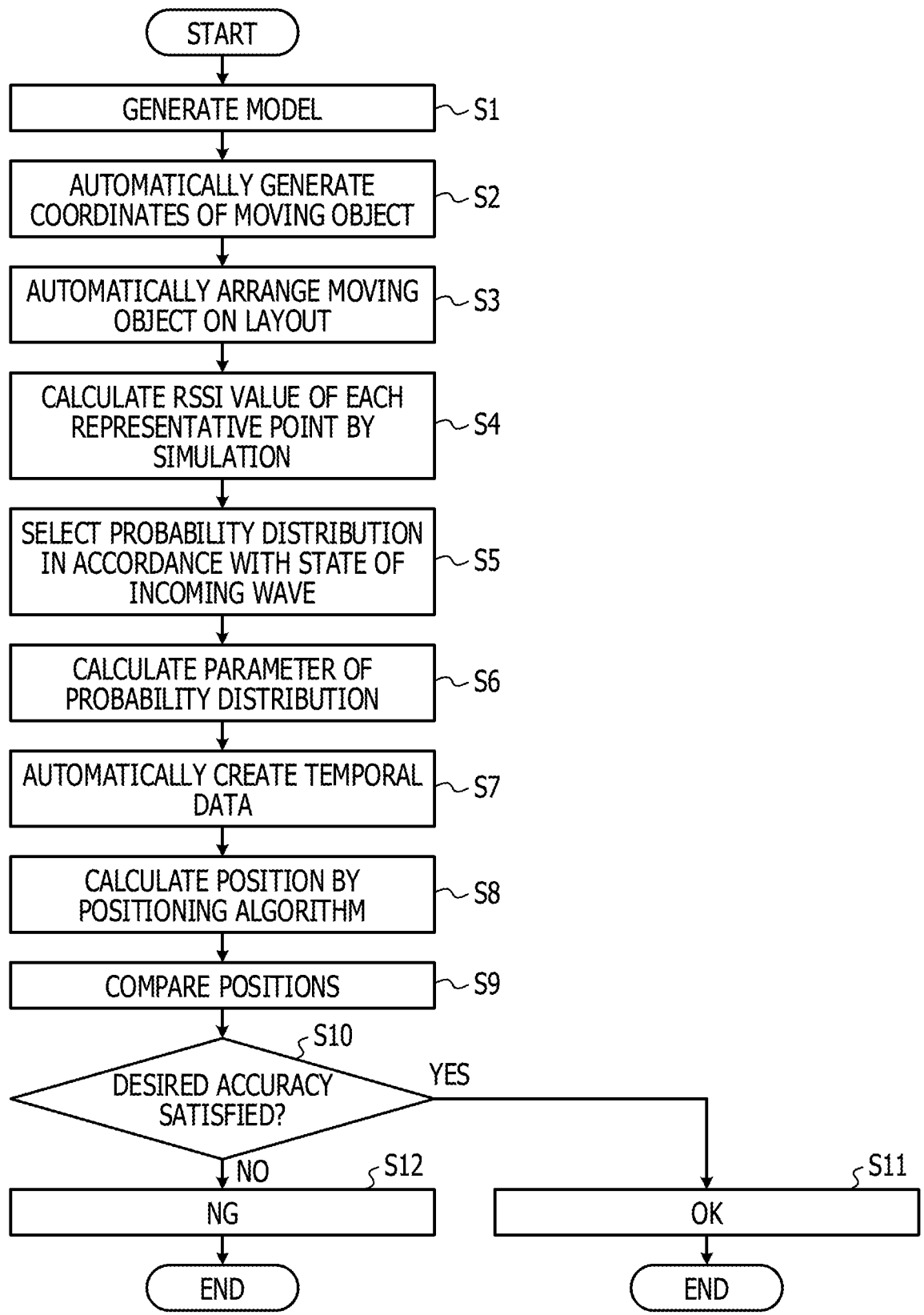
FIG. 3 is a diagram illustrating a flowchart of a simulation performed by the received power estimation device.

FIG. 3 is a diagram illustrating a flowchart of a simulation performed by the received power estimation device 100. With reference to FIG. 2A and FIG. 3, a simulation performed by the received power estimation device 100 will be described below. Note that, before the process in the flowchart of FIG. 3 is performed, a layout model, the deployment location of each transmitter in the layout model, and the traveling area of a moving object are input in advance by the user using the input device 104. Note that a layout model is a virtual three-dimensional space representing a structure to which a positioning system is to be introduced.

As illustrated in FIG. 3, the model generation unit 10 deploys each transmitter at a deployment location in a layout model and thereby generates a layout model to be simulated (step S1).

Figure 4:
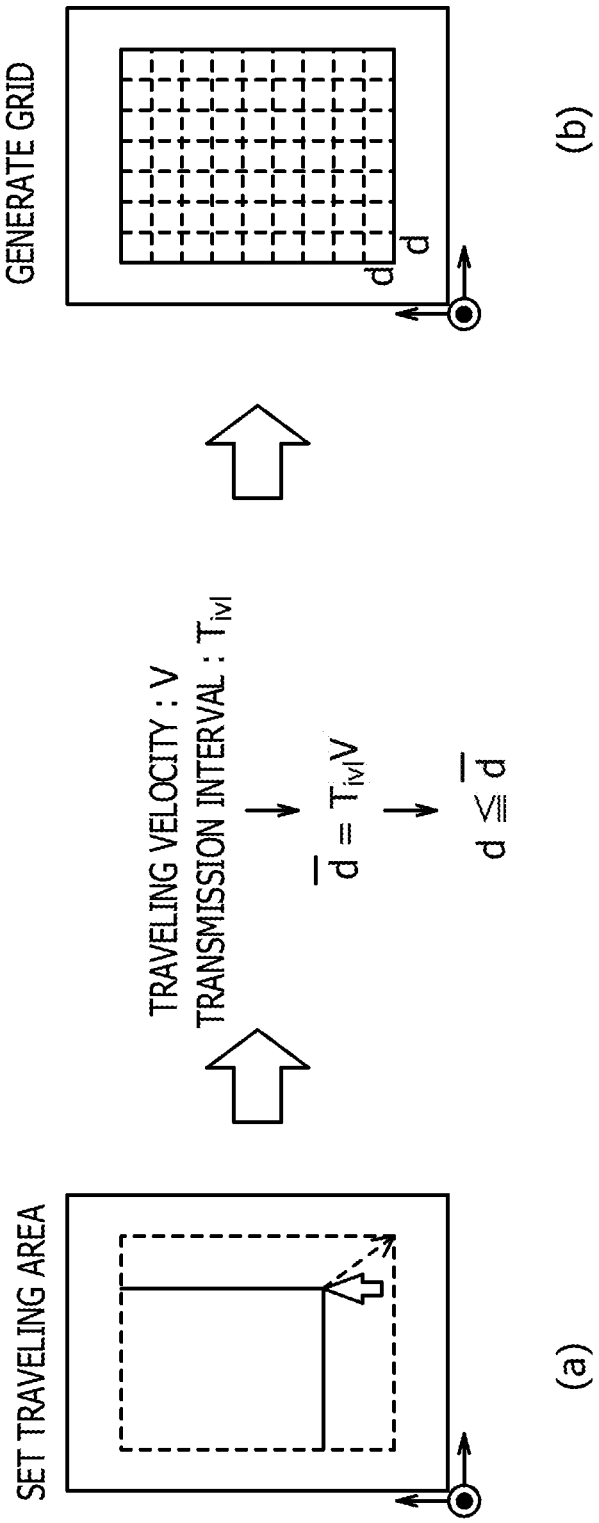
FIG. 4 is a diagram illustrating a case where a user sets a traveling area by using a mouse or the like, and coordinates of a moving object.

Next, the moving object arrangement unit 20 sets a traveling area and generates a grid of an interval d within the traveling area in the layout model. Next, the moving object arrangement unit 20 defines intersections in the grid as coordinates at which a three-dimensional moving object is deployed. In such a way, the moving object arrangement unit 20 automatically generates coordinates of a moving object (step S2). (a) in FIG. 4 is a diagram illustrating a case where the user sets a traveling area by using a mouse or the like. (b) in FIG. 4 is a diagram illustrating coordinates of a moving object.

Note that it is preferable that a recommended value of the grid interval d be defined as the following Equation (1) in accordance with a velocity V of a moving object and a transmission interval $T_{ivl}$. In this case, an RSSI value can be calculated for each transmission interval $T_{ivl}$. It is preferable that the grid interval d be less than or equal to the recommended value described above. The transmission interval $T_{ivl}$ is an interval at which the transmitter 202 periodically transmits radio signals. Note that, when the moving velocity is not the same over time, it is preferable to determine a grid interval by using the minimum velocity and to define an arrangement location of the moving object as a grid position at a timing close to a transmission timing.

$$d = T_{ivl} V \quad (1)$$

Figure 5:
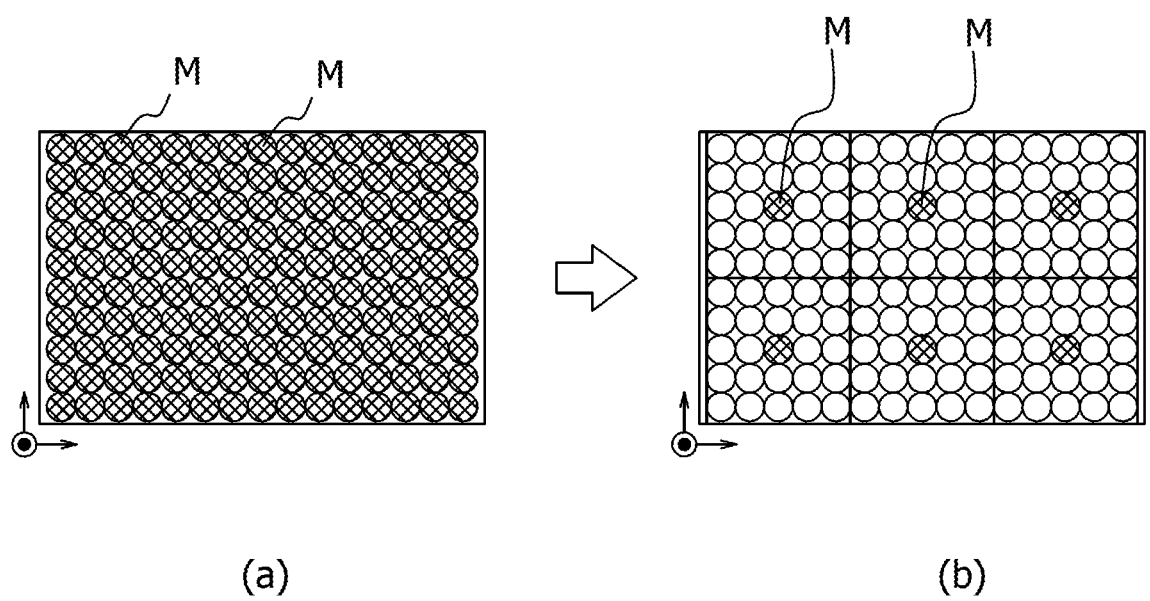
FIG. 5 is a diagram illustrating an arrangement of a moving object.

Next, the moving object arrangement unit 20 automatically arranges a moving object M in the layout model (step S3). For example, when simulations are performed for all the position candidates, the moving object M is deployed at each of the coordinates generated in step S2, as illustrated in (a) in FIG. 5. In this case, however, the time taken for the simulations will be long. Thus, in the present embodiment, as illustrated in (b) in FIG. 5, the moving object arrangement unit 20 selects some coordinates as representative points out of the coordinates generated in step S2 and arranges the moving objects M at the representative points. For example, the moving object arrangement unit 20 divides the moving object area into a plurality of blocks smaller than the moving object area and selects one point such as the center of each block as a representative point.

Next, the simulation unit 30 calculates an RSSI value by a radio wave propagation simulation for the representative points selected in step S3 (step S4). Note that a ray trace simulation or the like can be used for a radio wave propagation simulation. The ray trace simulation can simulate an RSSI value for each path from the transmitter 202 to the receiver 201. Note that, since the same radio wave propagation simulation is performed for other transmitters 202, results of the radio wave propagation simulations can be obtained for all of the transmitters 202.

Next, the selection unit 40 selects a probability distribution in accordance with a state of an incoming wave (for example, whether the incoming wave having an RSSI value above a threshold is a direct wave or a reflected wave) for each representative point (step S5). For example, a probability distribution can be selected in accordance with whether the dominant incoming wave is a direct wave or a reflected wave. Specifically, it is preferable to select a probability distribution in accordance with whether the incoming wave having the largest RSSI value is a direct wave or a reflected wave.

When the incoming wave having an RSSI value above a threshold is a direct wave, the radio wave environment is favorable at the representative point of interest. In this case, since the dispersion of RSSI values is relatively small, the distribution of the RSSI values is considered to be approximated in a Nakagami-Rice distribution, as illustrated in (a) in FIG. 6. Therefore, when the incoming wave having an RSSI value above a threshold is a direct wave, the selection unit 40 selects the Nakagami-Rice distribution. On the other hand, when the incoming wave having an RSSI value above the threshold (for example, the largest RSSI value) is a reflected wave, the radio wave environment is not favorable at the representative point of interest. In this case, since the dispersion of the RSSI values is relatively large, the distribution of RSSI values is considered to be approximated in a Rayleigh distribution, as illustrated in (a) in FIG. 6. This occurs particularly when the distances between transmitters and a receiver are the same in the same environment. Therefore, when the incoming wave having an RSSI value above the threshold is a reflected wave, the selection unit 40 selects the Rayleigh distribution.

Next, the parameter calculation unit 50 calculates a parameter of the probability distribution selected in step S5 (step S6). As an example, the parameter calculation unit 50 calculates a dispersion value σ and an average value μ of the probability distribution. For example, the parameter calculation unit 50 uses a parameter of a layout model when calculating the dispersion value σ. For example, as a parameter of a layout model, the parameter calculation unit 50 uses the complexity of a structure Ns, the quantity of people Nh, the degree of congestion of radio waves (PER) $P_{per}$, the traveling velocity of a moving object V, or the like in a layout model. For example, the parameter calculation unit 50 uses a function defining the dispersion value σ and calculates the dispersion value σ in accordance with σ=F (Ns, Nh, $P_{per}$, V). Alternatively, the parameter calculation unit 50 acquires the dispersion value σ by using the complexity of a structure Ns, the quantity of people Nh, the degree of congestion of radio waves (PER) $P_{per}$, and the traveling velocity of a moving object V in accordance with a table prepared in advance.

Figure 6:
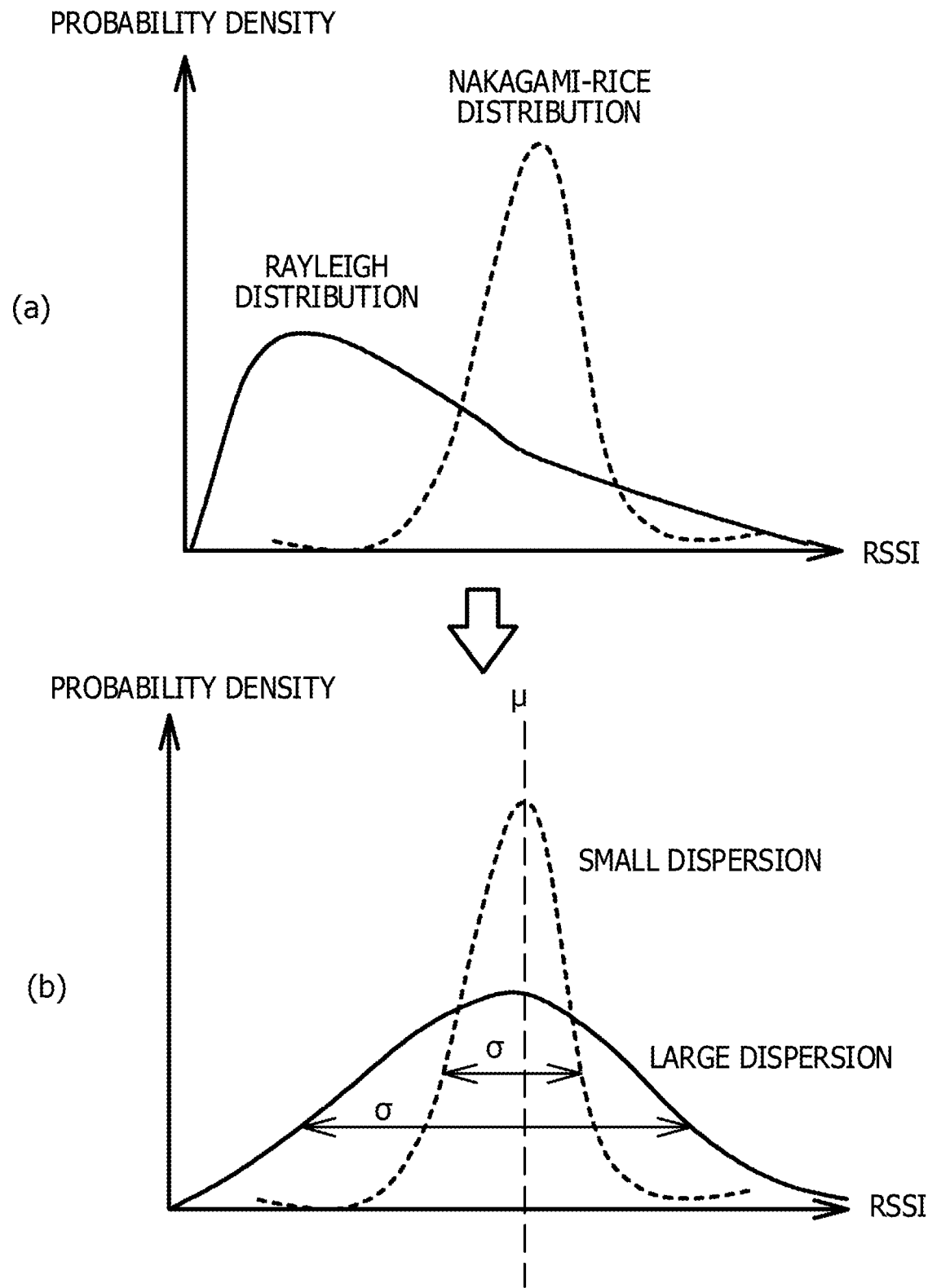
FIG. 6 is a diagram illustrating a probability distribution, and calculation of a parameter of the probability distribution.

Next, the parameter calculation unit 50 may use, as the average value μ, RSSI values above a threshold at representative points to be simulated. Further, the parameter calculation unit 50 may use, as the average value μ, a statistical amount such as an average value of RSSI values of a plurality of paths having RSSI values above a threshold at representative points to be simulated. Alternatively, the parameter calculation unit 50 may reflect simulation results of representative points around the representative point in interest. For example, the parameter calculation unit 50 may use an average value of a simulation result for a representative point to be simulated and simulation results for the representative points around the representative point. (b) in FIG. 6 is a diagram illustrating calculation of a parameter of a Nakagami-Rice distribution.

Next, the temporal data creation unit 60 calculates an RSSI value at coordinates of points other than the representative point in accordance with the probability distribution for the representative point on a block basis. For example, when MATLAB is used, an RSSI value probability distribution can be easily created by using a function of creating a Rayleigh distribution or a Nakagami-Rice distribution to provide an average value and a dispersion value calculated by the parameter calculation unit 50. Random numbers are generated in accordance with the probability distribution (Rayleigh distribution or Nakagami-Rice distribution) calculated for the representative point, and a resultant value is defined as the RSSI value for each point near and other than the representative point. Further, without use of an equation, random numbers may be generated in accordance with a table for each parameter of a Rayleigh distribution or a Nakagami-Rice distribution prepared in advance, and the value of the random number may be defined as the RSSI value for each point.

Next, the temporal data creation unit 60 calculates a traveling distance in accordance with coordinates of a moving object and coordinates of a departure point and calculates a time at coordinates in accordance with the traveling velocity. Thereby, the temporal data creation unit 60 creates temporal data by grouping data at the same time on a path basis (step S7).

Figure 7:
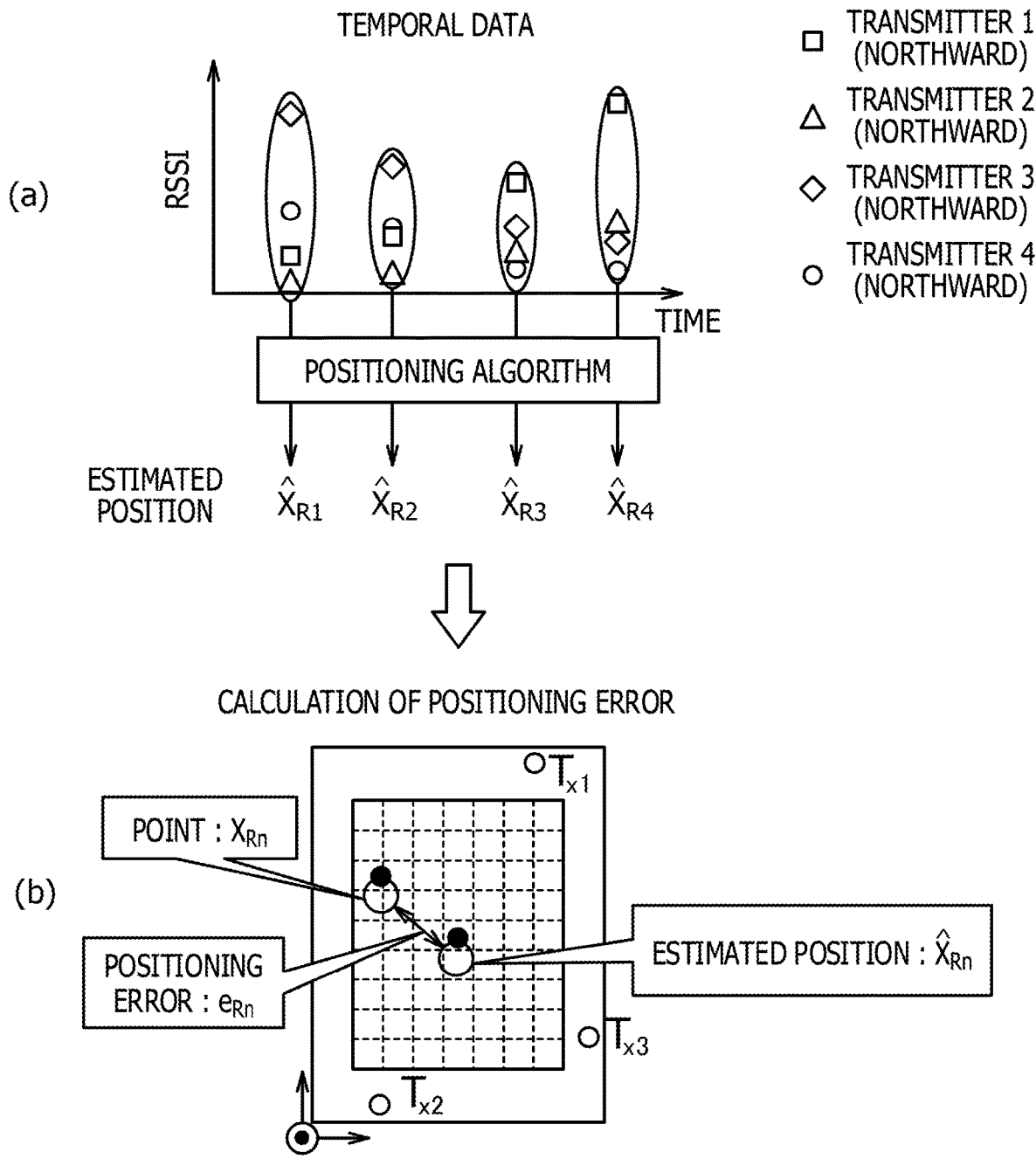
FIG. 7 is a diagram illustrating measurement of a positioning error.

Next, the position estimation unit 70 applies a positioning algorithm to the temporal data created in step S7 and thereby calculates the position at each time, as illustrated in (a) in FIG. 7 (step S8). The positioning algorithm is not limited in particular. As an example, an algorithm for measuring a position in accordance with signal strength from a plurality of transmission points (three-point positioning algorithm) may be used.

Figure 8:
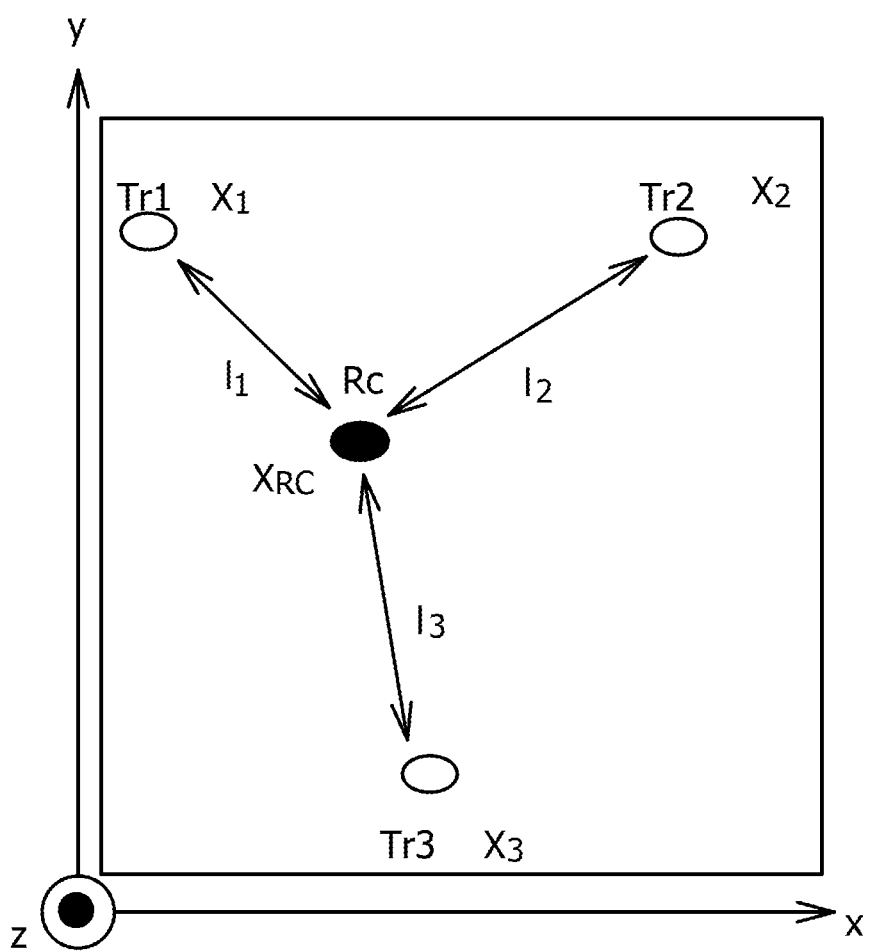
FIG. 8 is a diagram illustrating a three-point positioning algorithm.

FIG. 8 is a diagram illustrating a three-point positioning algorithm. For example, a receiver Rc (at a position $X_{RC}$) receives packets from three transmitters Tr1, Tr2, and Tr3 installed at known positions $X_1$, $X_2$, and $X_3$. Distances $I_1$, $I_2$, and $I_3$ can be calculated from $r_1$, $r_2$, and $r_3$, which denote RSSI values from respective transmitters, by using Equation (2) below. Equation (2) below is the Frith's formula for estimating a distance in accordance with RSSI values on an assumption of a free space. Next, by using Equation (3) and Equation (4) below, the position of the receiver Rc can be estimated from the position of each transmitter and the distance between the transmitter Tr and the receiver Rc. Note that, when i=3 and $Z_{Rc}$ is a constant, Equation (3) and Equation (4) below form a simultaneous linear equation with two unknowns.

$$I_i = f(r_i) \tag{2}$$

$$\|X_i - X_{Rc}\| = I_i \tag{3}$$

$$X_{Rc} = (x_{Rc}, y_{Rc}, z_{Rc})^T \tag{4}$$

In addition, an algorithm such as Radio Map disclosed in "A Survey of Selected Indoor Positioning Methods for Smartphones", Pavel Davidson and Robert Piche, IEEE COMMUNICATIONS SURVEYS & TUTORIALS, VOL. 19, NO. 2, SECOND QUARTER 2017, 2017 (a table of RSSI values and positions is prepared in advance, and a position is estimated with reference to an obtained RSSI value and the table), Deterministic Fingerprinting Algorithms (a table of RSSI values and positions is prepared in advance, and a position is estimated to minimize errors of RSSI values obtained from a plurality of transmitters) may be used as a positioning algorithm.

Next, the comparison unit 80 compares a position of coordinates at which a moving object is deployed with the position calculated in step S8 (step S9). For example, the comparison unit 80 uses Equation (5) below to calculate a difference (positioning error) between an arrangement position $X_{Rn}$ of a moving object and the estimated position calculated in step S8, as illustrated in (b) in FIG. 7. The comparison unit 80 calculates a positioning error for each coordinate position.

$$e_{Rn}=\|\hat{X}_{Rn}-X_{Rn}\| \qquad (5)$$

Next, the determination unit 90 calculates positioning accuracy of the positioning system in accordance with a comparison result in step S9. The determination unit 90 determines whether or not a desired positioning accuracy is obtained in accordance with the calculated positioning accuracy (step S10). For example, the determination unit 90 may use each positioning error calculated on a coordinate basis in step S9 as a positioning accuracy value and determine whether or not all the positioning errors are less than a threshold. Alternatively, the determination unit 90 may calculate an average value of positioning errors calculated for respective coordinates in step S9 as a positioning accuracy value and determine whether or not the positioning accuracy is less than a threshold. Otherwise, the determination unit 90 may determine whether or not desired positioning accuracy is obtained by calculating a statistical amount other than the average value of the positioning errors calculated for respective coordinates in step S9 as a positioning accuracy value and determining whether or not the positioning accuracy satisfies a predetermined condition.

If "Yes" is determined in step S10, the determination unit 90 outputs information indicating that the desired accuracy is obtained (step S11). Execution of the flowchart then ends. If "No" is determined in step S10, the determination unit 90 outputs information indicating that the desired accuracy is not obtained (step S12). In this case, the deployment position of the transmitter 202 or the like is changed in the layout model by the user, and the process indicated by the flowchart of FIG. 3 is restarted.

According to the embodiment, a probability distribution is selected in accordance with an incoming wave in which received power obtained by a simulation in a layout model is above a threshold. A parameter of the probability distribution is estimated from received power above the threshold and a propagation environment in the layout model, and received power at positions around a position to be simulated is estimated by using the probability distribution to which the parameter is reflected. Thus, since simulations do not have to be performed for all the coordinates, the time taken to simulate the positioning accuracy can be reduced.

The approximation accuracy of a distribution of received power is improved by selecting a Nakagami-Rice distribution when an incoming wave having received power above a threshold is a direct wave and selecting a Rayleigh distribution when the incoming wave is a reflected wave.

It can be accurately determined whether the dominant incoming wave is a direct wave or a reflected wave by focusing on an incoming wave having the largest received power obtained as a result of the simulation.

The position of a receiver is estimated by using a predetermined positioning algorithm in accordance with a parameter of an incoming radio wave obtained by a simulation in a layout model, and the estimated position and a deployment position of the receiver specified in the layout model are compared with each other. This enables a simulation of positioning accuracy in the layout model.

Figure 9:
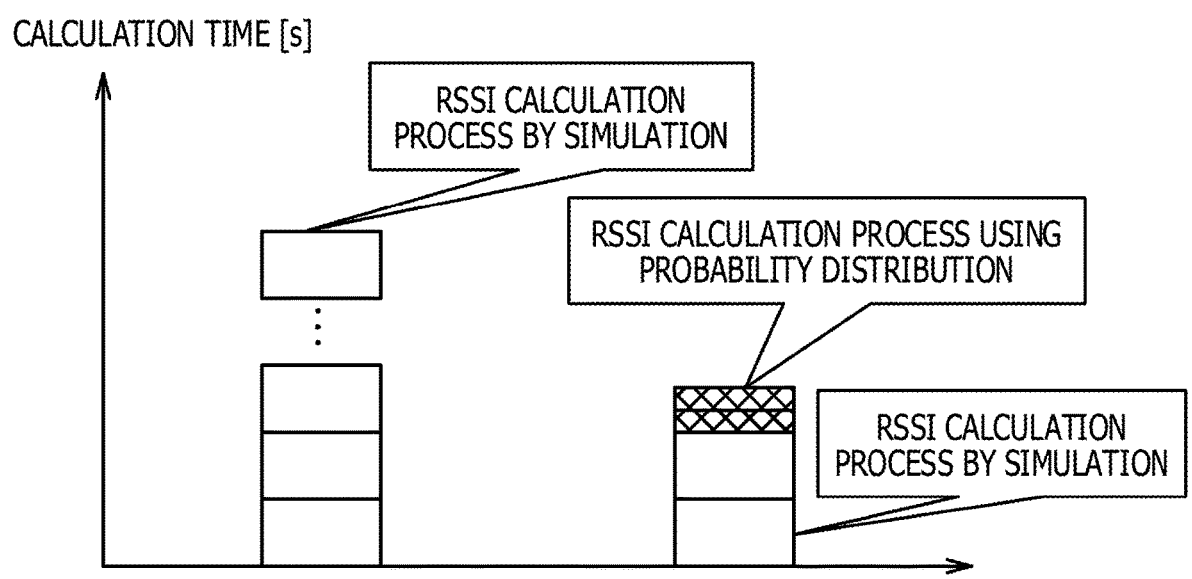
FIG. 9 is a diagram illustrating comparison of time taken for a simulation.

Note that, when a radio wave propagation simulation is performed for all the coordinates in a moving object area, since radio wave propagation simulations are performed sequentially for respective coordinates, it takes time to calculate RSSI values, as illustrated on the left side in FIG. 9. In contrast, for example, when simulations are performed on two representative points, RSSI values for other coordinates are calculated in accordance with a probability distribution after the radio wave propagation simulations are performed for the two representative points, as illustrated on the right side in FIG. 9. In this case, the time taken for calculating RSSI values is reduced.

Figure 10A:
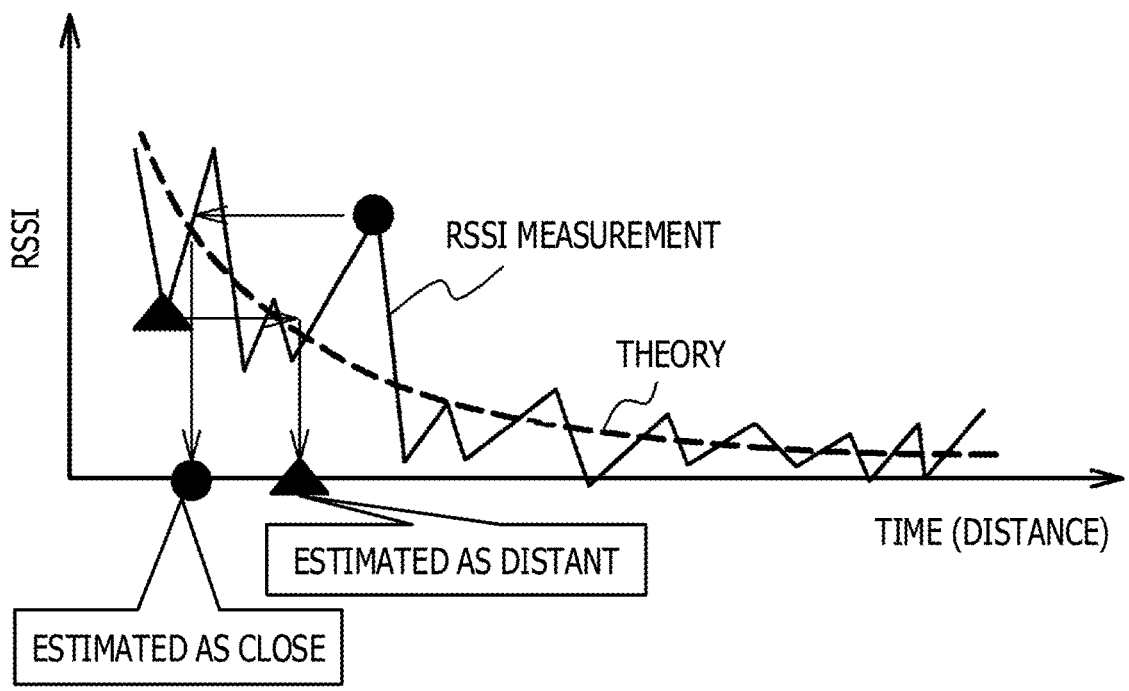
FIG. 10A and FIG. 10B are diagrams illustrating averaging by using a time window.
Figure 10B:
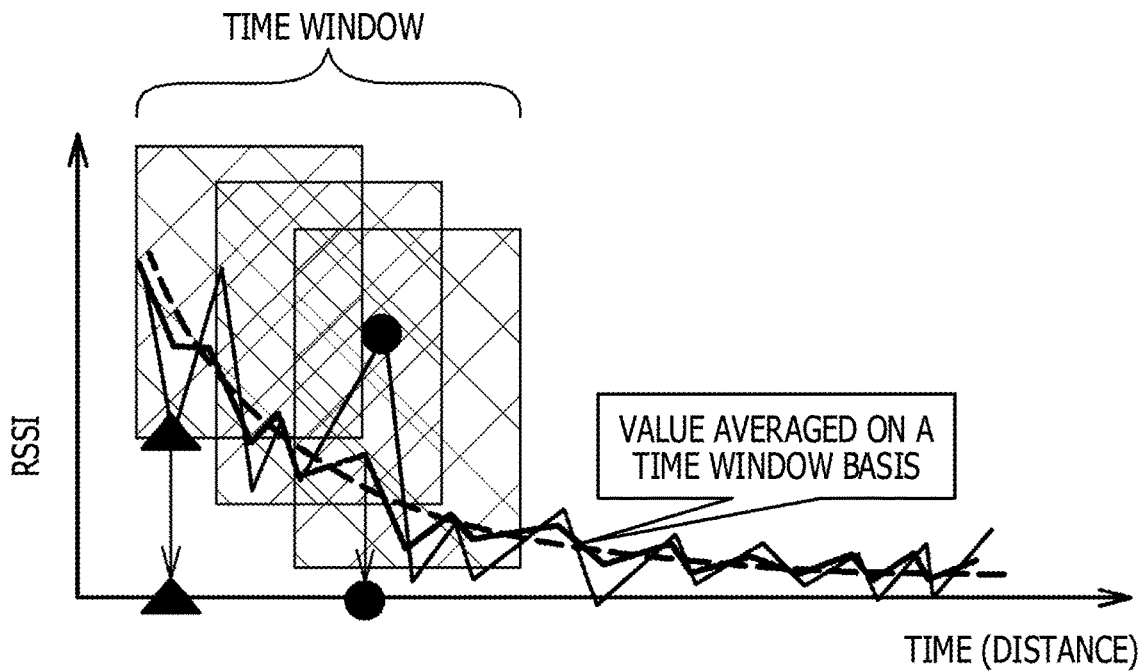

The relationship between RSSI value and distance in a specific case may not match a theoretical value because of the influence of fading that occurs due to a reflection of a radio wave or motion of an object. For example, as illustrated in FIG. 10A, there may be variation in the RSSI value at each traveling distance (each time) of a moving object. In this case, the distance from the transmitter 202 may be estimated to be shorter at coordinates where the RSSI value increases due to variation. On the other hand, the distance from the transmitter 202 may be estimated to be longer at coordinates where the RSSI value decreases due to variation. Thus, as illustrated in FIG. 10B, it is considered that a plurality of time windows are provided and a value averaged on a window basis (such as an average value) is used. In this case, since the influence of variation on the RSSI value can be suppressed, the calculation accuracy in the positioning accuracy can be improved.

Figure 11:
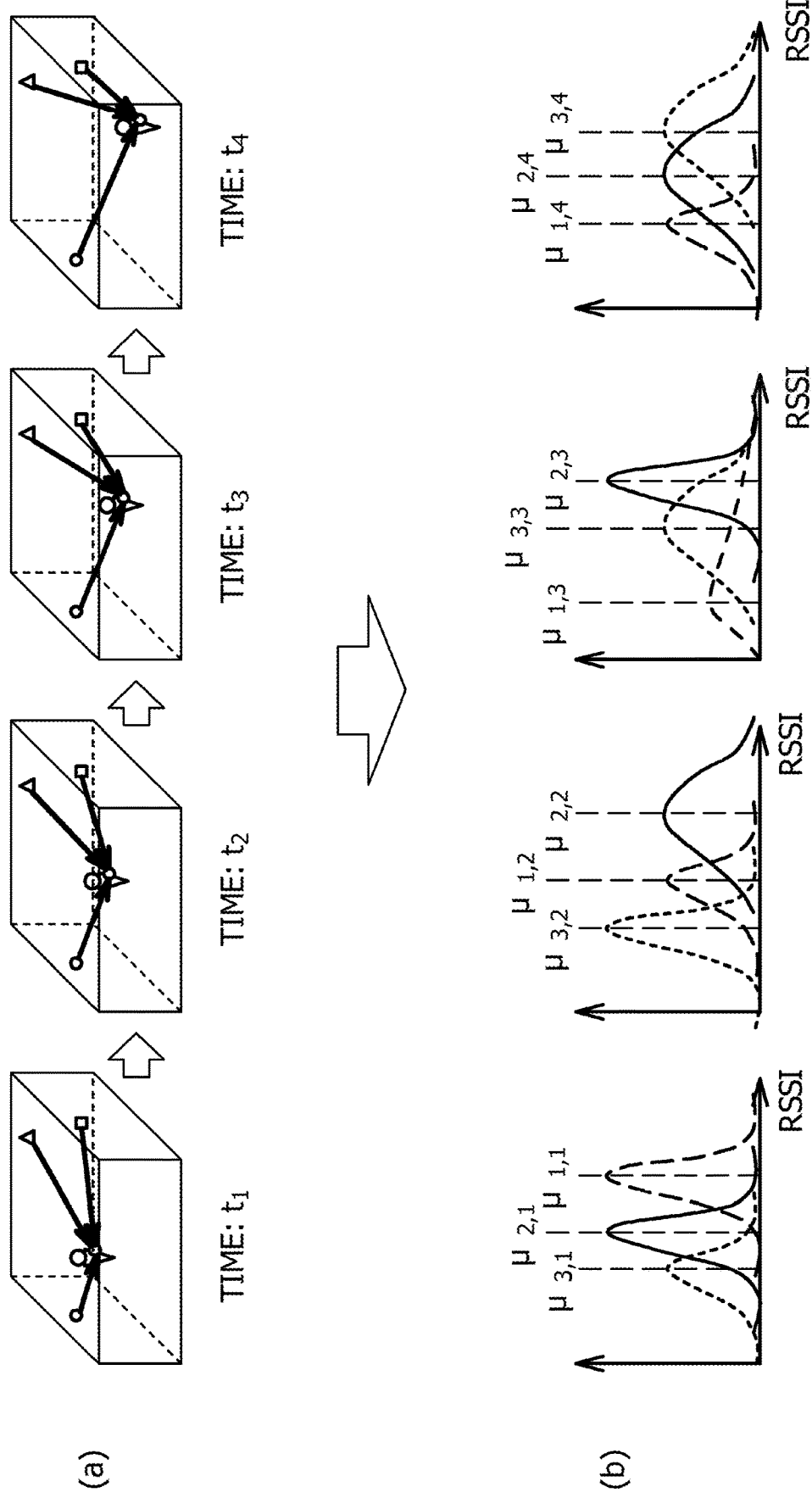
FIG. 11 is a diagram illustrating a simulation.
Figure 12:
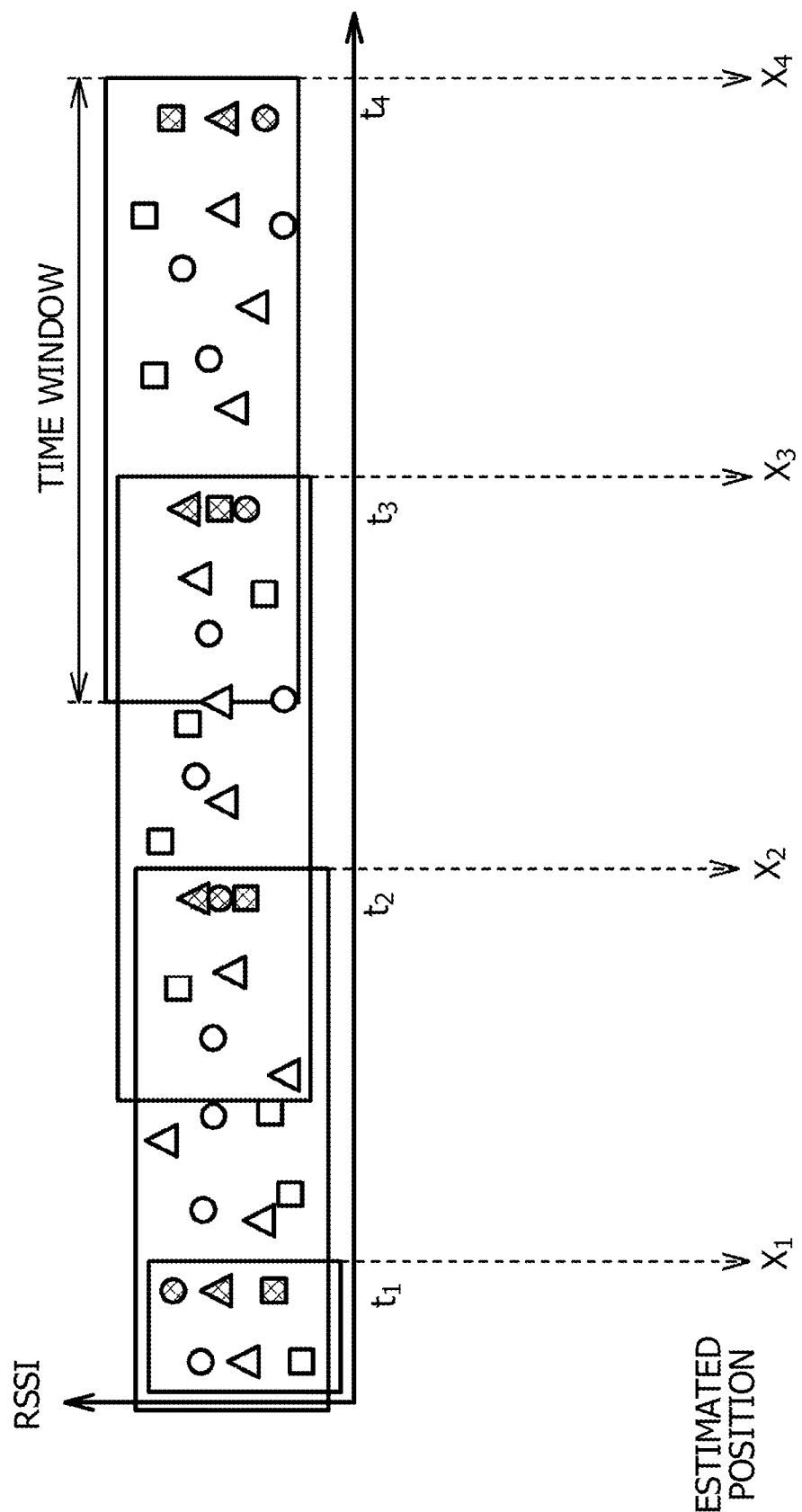
FIG. 12 is a diagram illustrating a simulation.

In this case, as illustrated in (a) in FIG. 11, a radio wave propagation simulation is performed at each position of a moving object and each position of a transmitter over elapsing time (time t1, t2, t3, t4, . . . ) at each representative point. In this case, in order to suppress the influence of fading, packets are received for a certain time period, and a representative value such as an average value or the maximum value of the RSSI values of the observation span (time window) is calculated as the RSSI value. At each representative point, a probability distribution is selected in accordance with an incoming wave whose calculated RSSI value is above a threshold. Further, as illustrated in (b) in FIG. 11, a parameter of each probability distribution is calculated. As illustrated in FIG. 12, temporal data of the obtained RSSI values is converted to a value averaged on a time window basis. In FIG. 12, the hatched RSSI values are the simulation result, which is a result of other RSSI values being generated as random values based on the probability distribution. The converted RSSI value is applied to a positioning algorithm, and thereby the position Xn at each time tn is estimated. With calculation of a positioning error at the time tn, a positioning accuracy can be measured at high accuracy.

Figure 13:
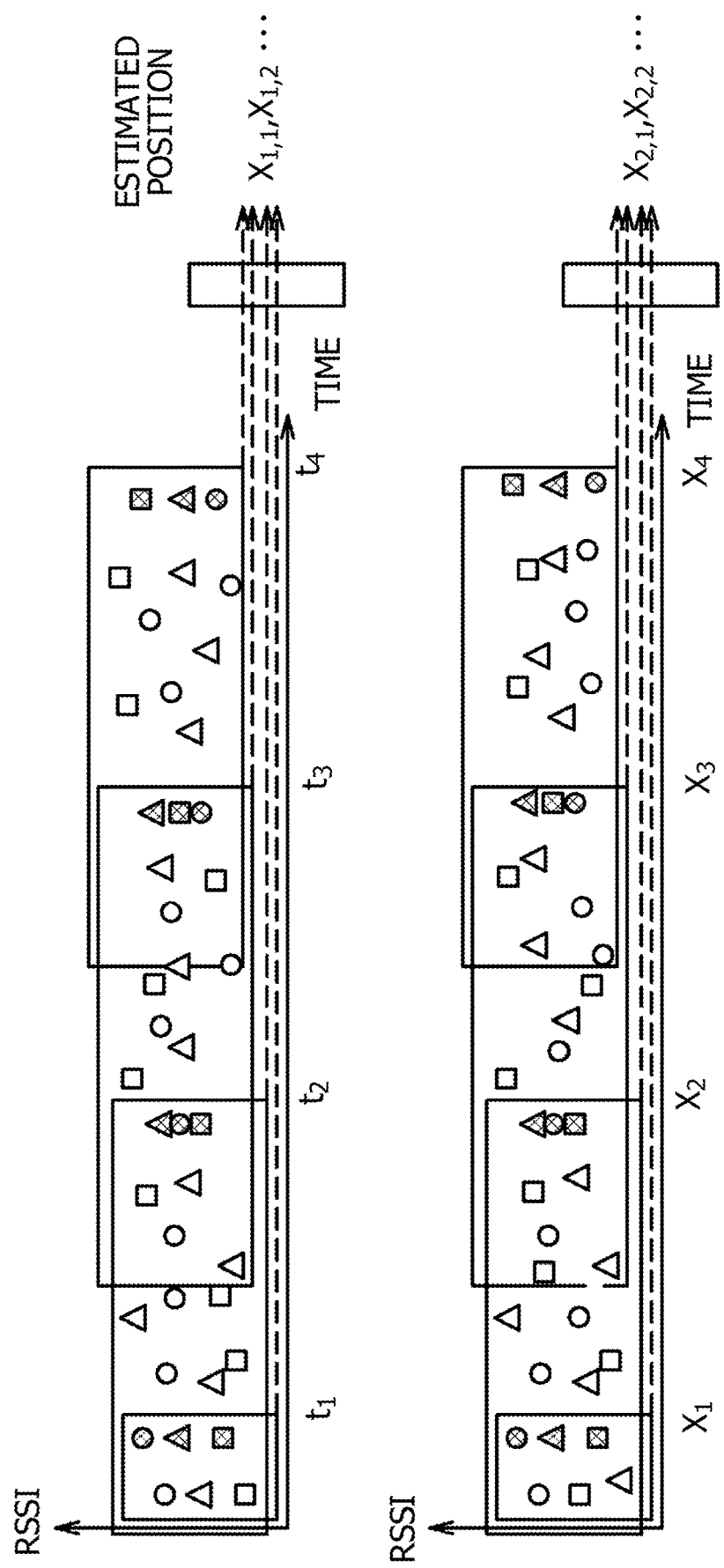
FIG. 13 is a diagram illustrating a simulation.

Alternatively, as illustrated in FIG. 13, in generating random values of RSSI values, a statistical amount such as an average value, the maximum value, or the like of position estimation errors may be calculated by preparing a plurality of data sets and repeating calculation of the estimated position in accordance with the probability distribution.

Figure 14A:
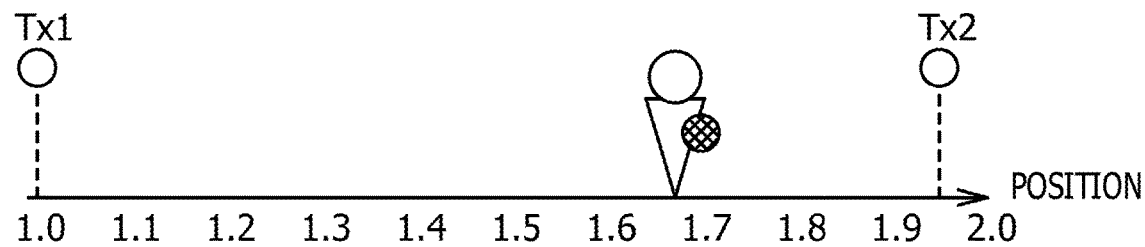
FIG. 14A and FIG. 14B are diagrams illustrating a simulation.
Figure 14B:
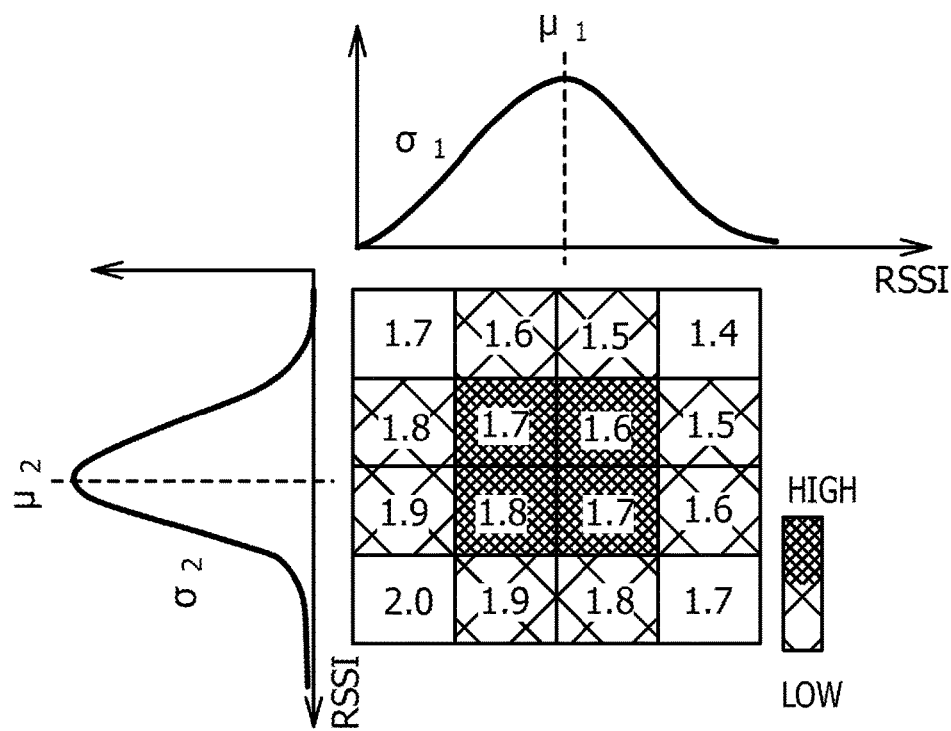

Further, a table indicating a relationship between data sets of RSSI values and estimated positions may be prepared in advance. In this case, a probability of occurrence of a data set in interest is calculated from a probability distribution of the RSSI value, and the estimated position can be calculated by performing weighting sum with the probability on the corresponding estimated position or calculating the most frequent value. In FIG. 14A, the hatched portion is an example of a representative point to be simulated between the transmitter Tx1 and the transmitter Tx2. The values in the table of FIG. 14B indicate a two-dimensional distribution of the position estimation result calculated in advance in accordance with RSSI values from the two transmitter Tx1 and Tx2. The light and shade represents a probability of occurrence of a combination of RSSI values. Shade parts correspond to a high probability, and light parts correspond to a low probability. For example, in the example of FIG. 14B, a weighted average is 1.7, and the most frequent value is 1.7.

Figure 15:
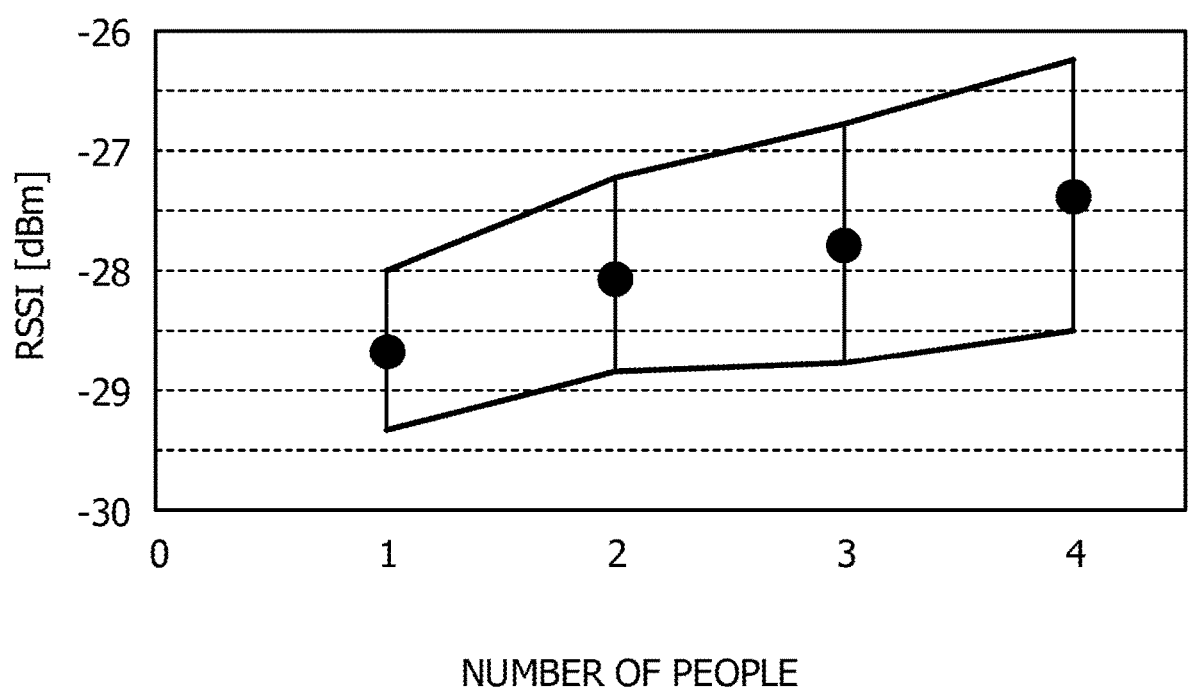
FIG. 15 is a diagram illustrating a dispersion of a probability distribution of received power.

Note that, as illustrated in FIG. 15, it has been apparent from experiments that the dispersion of a probability distribution of received power is affected by a quantity of people moving nearby. For example, ""Estimation of Received Level Fluctuation of Moving object in Indoor Environment by Using Ray Trace Method", Hiromasa YAMAUCHI, Ichiro Ida, and Teruhisa NINOMIYA, SRW Workshop, 2016" may be referenced. In accordance with this result, in calculation of the dispersion value σ of a probability distribution, a use of a quantity of people Nh improves the calculation accuracy of the dispersion value σ of the probability distribution.

While the positions of transmitters are fixed and a receiver is attached to a moving object in each example described above, the implementation is not limited thereto. For example, when a transmitter is attached to a moving object and the positions of one or more receivers are fixed, parameters of incoming radio waves can be simulated on a receiver basis. This enables estimation of the position of a transmitter in accordance with the parameters of the incoming radio waves. By comparing the estimated position of a transmitter in a layout model with a deployment position of the transmitter, it is possible to calculate the positioning accuracy.

In each example described above, the simulation unit 30 functions as an example of a simulation unit that simulates received power when a receiver receives a radio signal from a transmitter in a layout model of a structure in which the transmitter and the receiver are deployed. The selection unit 40 functions as an example of a selection unit that selects a probability distribution in accordance with an incoming wave having the received power above a threshold. The temporal data creation unit 60 functions as an example of a received power estimation unit that estimates a parameter of the probability distribution in accordance with the received power above the threshold and a propagation environment in the layout model and estimates received power at positions around the receiver by using the probability distribution to which the parameter is reflected. The position estimation unit 70 functions as an example of a position estimation unit that estimates a position of the transmitter by using a predetermined positioning algorithm in accordance with the received power obtained as a simulation result of the simulation unit. The determination unit 90 functions as an example of a positioning accuracy calculation unit that calculates a positioning accuracy of the layout model in accordance with a deployment position of the transmitter specified in the layout model and an estimated position estimated by the estimation unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to:
obtain location information indicating locations of a wireless transmitter and a wireless receiver;
perform a simulation of a first power of a first reception signal at the wireless receiver in accordance with a radio signal transmitted from the wireless transmitter;
determine whether a main component of the first reception signal is a direct wave or a reflected wave based on the simulation of the first power;
identify a first probability distribution model in accordance with the determined main component;
identify a first parameter of the first probability distribution model in accordance with the determined main component and a propagation environment defined by the locations of the wireless transmitter and the wireless receiver indicated by the location information; and
based on the first probability distribution model using the first parameter, simulate a second power of a second reception signal at the wireless receiver.

2. The information processing apparatus according to claim 1, wherein
the processor is configured to determine the first power by using a simulation in accordance with the location information.

3. The information processing apparatus according to claim 2, wherein
the processor is configured to:
select the first probability distribution model from a plurality of probability distribution models include a Nakagami-Rice distribution model and a Rayleigh distribution model; and
select the Nakagami-Rice distribution model as the first probability distribution model when the main component of the first reception signal is the direct wave and select the Rayleigh distribution model as the first probability distribution model when the main component of the first reception signal is the reflected wave.

4. The information processing apparatus according to claim 2, wherein
the first power is the largest power obtained by the simulation.

5. The information processing apparatus according to claim 2, wherein
the processor is configured to calculate a dispersion of the first probability distribution model as the first parameter by using a function or a table including a second parameter of the location information.

6. The information processing apparatus according to claim 2, wherein
the processor is configured to determine the first parameter by using the simulation in accordance with other location information.

7. The information processing apparatus according to claim 2, wherein
the processor is configured to calculate the first parameter by using a statistical value of a path on which the first power is greater than the threshold value from a plurality of paths between the wireless receiver and the wireless transmitter.

8. The information processing apparatus according to claim 2, wherein
the processor is configured to:
determine a first deployment position of the wireless receiver by using a positioning algorithm based on the first power determined by the simulation; and
determine a positioning accuracy of the location information based on a comparison of the location of the wireless receiver indicated by the location information with the first deployment position of the wireless receiver determined by using the positioning algorithm.

9. The information processing apparatus according to claim 2, wherein the processor is configured to:
determine a second deployment position of the wireless transmitter by using a positioning algorithm based on the first power determined by the simulation; and
determine a positioning accuracy of the location information based on a comparison of the position of the wireless transmitter indicated by the location information with the second deployment position of the wireless transmitter determined by using the positioning algorithm.

10. The information processing apparatus according to claim 8, wherein
the positioning algorithm is a three-point positioning algorithm.

11. The information processing apparatus according to claim 8, wherein
a location of the wireless transmitter is fixed and a location of the wireless receiver changeable, or the location of the wireless transmitter is changeable and the location of the wireless receiver fixed.

12. A method comprising:
obtaining location information indicating locations of a wireless transmitter and a wireless receiver;
performing a simulation of a first power of a first reception signal at the wireless receiver in accordance with a radio signal transmitted from the wireless transmitter;
determining a main component of the first reception signal is whether a direct wave or a reflected wave based on the simulation of the first power;
identifying a first probability distribution model in accordance with the determined main component;
identifying a first parameter of the first probability distribution model in accordance with the determined main component and a propagation environment defined by the locations of the wireless transmitter and the wireless receiver indicated by the location information; and
based on the first probability distribution model using the first parameter, simulating a second power of a second reception signal at the wireless receiver.

13. The method according to claim 12, further comprising:
determining the first power by using a simulation in accordance with the location information.

14. The method according to claim 13, further comprising:
selecting the first probability distribution model from a plurality of probability distribution models include a Nakagami-Rice distribution model and a Rayleigh distribution model; and
selecting the Nakagami-Rice distribution model as the first probability distribution model when the main component of the first reception signal is the direct wave and select the Rayleigh distribution model as the first probability distribution model when the main component of the first reception signal is the reflected wave.

15. The method according to claim 13, wherein
the first power is the largest power obtained by the simulation.

16. The method according to claim 13, further comprising:
calculating a dispersion of the first probability distribution model as the first parameter by using a function or a table including a second parameter of the location information.

17. A non-transitory computer-readable storage medium storing a program that causes an information processing apparatus to execute a process, the process comprising:
obtaining location information indicating locations of a wireless transmitter and a wireless receiver;
performing a simulation of a first power of a first reception signal at the wireless receiver in accordance with a radio signal transmitted from the wireless transmitter;
determining a main component of the first reception signal is whether a direct wave or a reflected wave based on the simulation of the first power;
identifying a first probability distribution model in accordance with the determined main component;
identifying a first parameter of the first probability distribution model in accordance with the determined main component and a propagation environment defined by the locations of the wireless transmitter and the wireless receiver indicated by the location information; and
based on the first probability distribution model using the first parameter, simulating a second power of a second reception signal at the wireless receiver.

18. The non-transitory computer-readable storage medium according to claim 17, further comprising:
determining the first power by using a simulation in accordance with the location information.

19. The non-transitory computer-readable storage medium according to claim 18, further comprising:
selecting the first probability distribution model from a plurality of probability distribution models include a Nakagami-Rice distribution model and a Rayleigh distribution model; and
selecting the Nakagami-Rice distribution model as the first probability distribution model when the main component of the first reception signal is the direct wave and select the Rayleigh distribution model as the first probability distribution model when the main component of the first reception signal is the reflected wave.

20. The non-transitory computer-readable storage medium according to claim 18, wherein
the first power is the largest power obtained by the simulation.

* * * * *